| United States Patent [19] | [11] Patent Number: 4,877,833 |
|---|---|
| Kondo et al. | [45] Date of Patent: Oct. 31, 1989 |

[54] HEAT RESISTANT COPOLYMER COMPOSITION

[75] Inventors: Masatsune Kondo; Kiyoshi Ogura; Koiti Kuramoto, all of Niihama, Japan

[73] Assignee: Sumitomo Naugatuck Co., Ltd., Osaka, Japan

[21] Appl. No.: 117,561

[22] Filed: Nov. 6, 1987

[30] Foreign Application Priority Data

Nov. 12, 1986 [JP] Japan ................................. 61-270521

[51] Int. Cl.[4] ...................... C08L 51/04; C08L 67/02; C08L 69/04; C08L 79/08
[52] U.S. Cl. ......................................... 525/64; 525/66; 525/67; 525/71; 525/73; 525/146; 525/166; 525/179; 525/205
[58] Field of Search ...................... 525/71, 73, 205, 64

[56] References Cited

U.S. PATENT DOCUMENTS

| 4,559,386 | 12/1985 | Wu | 525/71 |
|---|---|---|---|
| 4,567,233 | 1/1986 | Tomono et al. | 525/71 |
| 4,608,414 | 8/1986 | Kutsunai et al. | 525/71 |
| 4,663,390 | 5/1987 | Dean | 525/71 |
| 4,699,947 | 10/1987 | Kokubo | 525/71 |
| 4,701,493 | 10/1987 | Dean | 525/71 |

Primary Examiner—Allan M. Lieberman

[57] ABSTRACT

A heat resistant copolymer composition is provided by blending two kinds of copolymers one of which is obtainable by polymerizing a maleimide monomer (A), an aromatic vinyl monomer (B), an unsaturated nitrile monomer (C) and optionally at least one other comonomer copolymerizable therewith (D) in a specific monomer ratio in the presence or absence of an elastomeric polymer and which has an intrinsic viscosity of 0.3 to 1.2 dl/g, and another of which is obtainable by copolymerizing the aromatic vinyl monomer (B), the unsaturated nitrile (C) and optionally at least one other comonomer copolymerizable therewith (D) in a specific monomer ratio in the presence or absence of the elastomeric polymer and which has an intrinsic viscosity of 0.3 to 1.5 dl/g.

9 Claims, No Drawings

HEAT RESISTANT COPOLYMER COMPOSITION

BACKGROUND OF THE INVENTION

1. Field of the Invention

The present invention relates to a heat resistant copolymer composition. More particularly, it relates to a heat resistant copolymer composition having good processability and impact resistance.

2. Description of the Prior Art

Acrylonitrile-styrene (AS) resins and acrylonitrile-butediene-styrene (ABS) resins have good molding properties, chemical resistance and impact resistance and are widely used as materials for, for example, automobile parts, electrical parts, business machine parts, etc. However, these resins have inferior heat resistance compared to polycarbonate and modified polyphenylene ether and are required to have better heat resistance.

Recently, to improve heat resistance, an AS or ABS resin further comprising maleimide monomeric units as a component for imparting heat resistance to the resin has been developed. Further, a heat resistant resin composition comprising a blend of the resin which comprises the maleimide monomeric units (e.g. N-phenyl-maleimide-styrene copolymer) and a styrene-acrylonitrile copolymer is known from, for example, Japanese Patent Kokai Publication Nos. 98536/1982, 217535/1983 and 217537/1983.

The blend of the resin which comprises the maleimide monomeric units and the styrene-acrylonitrile copolymer is technically useful since the heat resistance of the composition can be easily controlled by changing the blend ratio of the two copolymers.

However, copolymers to be blended are often incompatible with each other. In such case, the effect of the copolymerization of maleimide monomer for the improvement of heat resistance is achieved to a lesser degree, and the obtained composition has poor balance of properties such as heat resistance, molding properties and resistance.

SUMMARY OF THE INVENTION

One object of the present invention is to provide a novel copolymer composition having improved heat resistance.

Another object of the present invention is to provide a novel copolymer composition having good balance of properties.

According to one aspect of the present invention, there is provided a heat resistant copolymer composition comprising:

5 to 95% by weight of a copolymer (I) which is obtainable by copolymerizing a maleimide monomer (A), an aromatic vinyl monomer (B), an unsaturated nitrile monomer (C) and optionally at least one other comonomer copolymerizable therewith (D) in the presence or absence of an elastomeric polymer and has a composition of the monomers (A), (B), (C) and (D) except for the elastomeric polymer which satisfies the below defined equations (1), (2), (3) and (4) and an intrinsic viscosity of 0.3 to 1.2 dl/g, and 95 to 5% by weight of a copolymer (II) which is obtainable by copolymerizing the aromatic vinyl monomer (B), the unsaturated nitrile (C) and optionally at least one other comonomer copolymerizable therewith (D) in the presence or absence of the elastomeric polymer and has a composition of the monomers (B), (C) and (D) except for the elastomeric polymer which satisfies the below defined equations (5) and (6) and an intrinsic viscosity of 0.3 to 1.5 dl/g, wherein the total weight percentage of the maleimide monomer (A) and the unsaturated nitrile monomer (C) per total weight of the monomers (A), (B), (C) and (D) except for the elastomeric polymer in the copolymer (I) and the weight percentage of the unsaturated nitrile monomer (C) per total weight of the monomers (B), (C) and (D) except for the elastomeric polymer in the copolymer (II) satisfy the equation:

(The total weight percentage of the maleimide monomer $(A)$ and the unsaturated monomer $(C)$ −
(The weight percentage of the unsaturated nitrile monomer $(C)$) =
+40 to −15% by weight, and the intrinsic viscosities of the copolymers (I) and (II) satisfy the equation:

(The intrinsic viscosity of the copolymer $(I)$) −
(The intrinsic viscosity of the copolymer $(II)$) =
+0.5 to −1.2 dl/g:

$$\frac{(A)}{(A)+(B)+(C)+(D)} \times 100 = 1 \text{ to } 60\% \text{ by weight} \quad (1)$$

$$\frac{(B)+(C)}{(A)+(B)+(C)+(D)} \times 100 = 99 \text{ to } 40\% \text{ by weight} \quad (2)$$

$$\frac{(D)}{(A)+(B)+(C)+(D)} \times 100 = 0 \text{ to } 50\% \text{ by weight} \quad (3)$$

$$\frac{(C)}{(B)+(C)} \times 100 = 5 \text{ to } 45\% \text{ by weight} \quad (4)$$

$$\frac{(D)}{(B)+(C)+(D)} \times 100 = 0 \text{ to } 50\% \text{ by weight} \quad (5)$$

$$\frac{(C)}{(B)+(C)} \times 100 = 20 \text{ to } 45\% \text{ by weight} \quad (6)$$

According to another aspect of the present invention, there is provided a heat resistant copolymer composition comprising 5 to 90% by weight of the copolymer (I), 5 to 90% by weight of the copolymer (II) and 0.5 to 90% by weight of at least one other polymeric component selected from the group consisting of thermoplastic resins and elastomers wherein the monomeric compositions of the copolymers (I) and (II) satisfy the equations (1) to (6) and the difference between the total weight percentage of the maleimide monomer (A) and the unsaturated nitrile monomer (C) per total weight of the monomers (A), (B), (C) and (D) except for the elastomeric polymer in the copolymer (I) and the weight percentage of the unsaturated nitrile monomer (C) per total weight of the monomers (B), (C) and (D) except for the elastomeric polymer in the copolymer (II) and the difference of intrinsic viscosity between the copolymers (I) and (II) are in the ranges specified above.

DETAILED DESCRIPTION OF THE INVENTION

Elastomeric polymer

The elastomeric polymer which may constitute the copolymer (I) or (II) is a polymer which is in a rubbery state at room temperature. Specific examples of the elastomeric polymer are polybutadiene, styrene-butadiene random or block copolymer, hydrogenated styrene-butadiene random or block copolymer, acrylonitrile-butadiene copolymer, neoprene rubber, chloroprene rubber, isobutylene rubber, natural rubber, ethylene-propylene rubber, ethylene-propylene-non conjugated diene rubber, chlorinated polyethylene, chlorinated ethylene-propylene-non conjugated diene rubber, acryl rubber, ethylene-vinyl acetate copolymer, (meth)acrylate copolymer comprising ethylene and (meth)acrylate (e.g. methyl, ethyl, propyl, butyl, glycidyl and dimethylaminoethyl (meth)acrylate), ethylene-vinyl acetate-glycidyl methacrylate copolymer, ethylene-methyl acrylate-glycidyl methacrylate copolymer, polyvinyl butyral, elastomeric polyester, elastomeric polyamide, and mixtures thereof. The elastomeric polymer may be used in a cross-linked or uncross-linked state.

Maleimide monomer (A)

Specific examples of the maleimide monomer (A) are maleimide, N-methylmaleimide, N-ethylmaleimide, N-isopropylmaleimide, N-butylmaleimide, N-hexylmaleimide, N-octylmaleimide, N-laurylmaleimide, N-cyclohexylmaleimide, N-phenylmaleimide, N-2-, 3- or 4-methylphenylmaleimide, N-2-, 3- or 4-ethylphenylmaleimide, N-2-, 3- or 4-butylphenylmaleimide, N-2,6-dimethylphenylmaleimide, N-2-, 3- or 4-chlorophenylmaleimide, N-2-, 3- or 4-bromophenylmaleimide, N-2,5-dichlorophenylmaleimide, N-3,4-dichlorophenylmaleimide, N-2,5-dibromophenylmaleimide, N-3,4-dibromophenylmaleimide, N-2,4,6-trichlorophenylmaleimide, N-2,4,6-tribromophenylmaleimide, N-2-, 3- or 4-hydroxyphenylmaleimide, N-2-, 3- or 4-methoxyphenylmaleimide, N-2-, 3- or 4-carboxyphenylmaleimide, N-4-nitrophenylmaleimide, N-4-diphenylmaleimide, N-1-naphthylphenylmaleimide, N-4-cyanophenylmaleimide, N-4-phenoxyphenylmaleimide, N-4-benzylphenylmaleimide, N-2-methyl-5-chlorophenylmaleimide, N-2-methoxy-5-chlorophenylmaleimide, and mixtures thereof. Among them, N-aryl-substitued maleimides are preferred.

Aromatic vinyl monomer (B)

Examples of the aromatic vinyl monomer (B) which constitutes the copolymer (I) or (II) are styrene, α-methylstyrene, α-chlorostyrene, p-tert.-butylstyrene, p-methylstyrene, o-chlorostyrene, p-chlorostyrene, 2,5-dichlorostyrene, 3,4-dichlorostyrene, p-bromostyrene, o-bromostyrene, 2,5-dibromostyrene, 3,4-dibromostyrene, 2-isopropenylnaphthalene, and mixtures thereof. Among them, styrene and α-methylstyrene are preferred.

Unsaturated nitrile monomer (C)

Specific examples of the unsaturated nitrile monomer which constitutes the copolymer (I) or (II) are acrylonitrile, methacrylonitrile, maleonitrile, fumaronitrile, and mixtures thereof. Among them, acrylonitrile is preferred.

Other comonomer (D)

Specific examples of other comonomer which optionally constitutes the copolymer (I) or (II) are (meth)acrylic acid, (meth)acrylate (e.g. methyl, ethyl, propyl, butyl, lauryl, cyclohexyl, 2-hydroxyethyl, glycidyl and dimethylaminoethyl (meth)acrylate), anhydride and ester of unsaturated carboxylic acid (e.g. maleic anhydride, itaconic anhydride, citraconic anhydride and corresponding esters), ethylene, propylene, butene-1, pentene-1, 4-methylpentene-1, vinyl chloride, vinylidene chloride, tetrafluoroethylene, monochlorotrifluoroethylene, hexafluoropropylene, butadiene, acrylamide, methacrylamide, vinyl acetate, vinylpyrrolidone, vinylpyridine, vinylcarbazole, vinyl ether, vinyl ketone, coumarone, indene, acenaphthylene, and mixtures thereof.

Copolymer (I)

The copolymer (I) to be used according to the present invention is obtainable by copolymerizing the maleimide monomer (A), the aromatic vinyl monomer (B), the unsaturated nitrile monomer (C) and optionally other comonomer (D) in the presence or absence of the elastomeric polymer and has a monomeric composition of the monomers (A), (B), (C) and (D), except for the elastomeric polymer, which satisfies the equations (1), (2), (3) and (4):

$$\frac{(A)}{(A) + (B) + (C) + (D)} \times 100 = 1 \text{ to } 60\% \text{ by weight} \quad (1)$$

$$\frac{(B) + (C)}{(A) + (B) + (C) + (D)} \times 100 = 99 \text{ to } 40\% \text{ by weight} \quad (2)$$

$$\frac{(D)}{(A) + (B) + (C) + (D)} \times 100 = 0 \text{ to } 50\% \text{ by weight} \quad (3)$$

$$\frac{(C)}{(B) + (C)} \times 100 = 5 \text{ to } 45\% \text{ by weight} \quad (4)$$

As shown by the equations (1) to (3), the copolymer except for the elastomeric polymer comprises 1 to 60% by weight of the maleimide monomer (A), 99 to 40% by weight of the aromatic vinyl monomer (B) and the unsaturated nitrile monomer (C) in total and 0 to 50% by weight of other comonomer (D). Further, as understood from the equation (4), the amount of the unsaturated nitrile monomer (C) is 5 to 45% by weight per total weight of the aromatic vinyl monomer (B) and the unsaturated nitrile monomer (C).

The copolymer (I) has an intrinsic viscosity of 0.3 to 1.2 dl/g. In the present specification, an intrinsic viscosity of a polymer is measured at 30° C. by using dimethylformamide as a solvent.

When the monomers are polymerized in the presence of the elastomeric polymer, a part of the monomers forms a non-grafted copolymer while the rest of the monomers forms a copolymer grafted on the elastomeric polymer. In this case, the intrinsic viscosity is intended to mean that of the non-grafted polymer. When present, the elastomeric polymer is designated at "(E)" in the appended claims.

The graft polymer may have any structure. Preferably, it has an average particle size of 0.05 to 3 μm and a graft ratio of 10 to 150% by weight.

When any monomer is used in an amount outside the range defined by the equations (1) to (3) or the ratio of the unsaturated monomer (C) to the total amount of the aromatic vinyl monomer (B) and the unsaturated monomer (C) is outside the range defined by the equation (4) or the intrinsic viscosity is outside the above range, the copolymer (I) has poor compatibility with the copolymer (II), and the final copolymer composition has unimproved balance of heat resistance, molding properties and mechanical strength. The unsaturated nitrile monomer (C) is an essential and important component in view of the compatibility of the copolymer (I) with the copolymer (II).

In view of the compatibility and the balance of properties, the monomeric compositions are preferably in ranges defined by the following equations (1'), (2'), (3') and (4'):

$$\frac{(A)}{(A) + (B) + (C) + (D)} \times 100 = 5 \text{ to } 50\% \text{ by weight} \quad (1')$$

$$\frac{(B) + (C)}{(A) + (B) + (C) + (D)} \times 100 = 95 \text{ to } 50\% \text{ by weight} \quad (2')$$

$$\frac{(D)}{(A) + (B) + (C) + (D)} \times 100 = 0 \text{ to } 40\% \text{ by weight} \quad (3')$$

$$\frac{(C)}{(B) + (C)} \times 100 = 10 \text{ to } 40\% \text{ by weight} \quad (4')$$

In view of the compatibility, it is preferred to further limit the ratio of the maleimide monomer (A) and the unsaturated nitrile monomer (C). Namely, the amount of maleimide monomer (A) is increased while that of the unsaturated nitrile monomer (C) is decreased. This relationship is expressed by the following equation:

Maleimide monomer (A) + Unsaturated monomer (B) =
30 to 55% by weight

There is no limitation on a weight ratio of the elastomeric polymer and the monomers in the copolymer (I). Preferably, the copolymer (I) comprises 0 to 80% by weight of the elastomeric polymer and 100 to 20% by weight of the total monomers. In view of the balance of properties, the copolymer (I) comprises 5 to 80% by weight of the elastomeric polymer and 95 to 20% by weight of the monomers.

The copolymer (I) may be a copolymer (I-i) which is prepared in the presence of the elastomeric polymer, a copolymer (I-ii) which is prepared in the absence of the elastomeric polymer or a mixture of the copolymers (I-i) and (I-ii). In case of the copolymer mixture, the monomeric compositions and intrinsic viscosity of the copolymer (I) are calculated from those of the copolymers (I-i) and (I-ii).

The copolymer (I) may be prepared by a per se known method. For example, the maleimide monomer (A) and the monomers (B) to (D) are directly copolymerized, or the a copolymer comprising maleic anhydride is converted to imide with ammonia, primary amine, isocyanate, etc. The copolymerization may be carried out in any manner such as bulk polymerization, suspension polymerization, bulk-suspension polymerization, emulsion polymerization, solution polymerization and combinations thereof.

Copolymer (II)

The copolymer (II) is obtainable by copolymerizing the aromatic vinyl monomer (B), the unsaturated nitrile (C) and optionally at least one other comonomer copolymerizable therewith (D) in the presence or absence of the elastomeric polymer and has a monomeric composition of the monomers (B), (C) and (D) except for the elastomeric polymer which satisfies the below defined equations (5) and (6) and an intrinsic viscosity of 0.3 to 1.5 dl/g:

$$\frac{(D)}{(B) + (C) + (D)} \times 100 = 0 \text{ to } 50\% \text{ by weight} \quad (5)$$

$$\frac{(C)}{(B) + (C)} \times 100 = 20 \text{ to } 45\% \text{ by weight} \quad (6)$$

As shown by the equation (5), the copolymer except for the elastomeric polymer comprises 100 to 50% by weight of the aromatic vinyl monomer (B) and the unsaturated nitrile monomer (C) in total and 0 to 50% by weight of other comonomer (D). Further, as understood from the equation (6), the amount of the unsaturated nitrile monomer (C) is 20 to 45% by weight per total weight of the aromatic vinyl monomer (B) and the unsaturated nitrile monomer (C).

The copolymer (II) has an intrinsic viscosity of 0.3 to 1.5 dl/g.

When the monomers are polymerized in the presence of the elastomeric polymer, a part of the monomers forms a non-grafted copolymer while the rest of the monomers forms a copolymer grafted on the elastomeric polymer. In this case, the intrinsic viscosity is intended to mean that of the non-grafted polymer.

The graft polymer may have any structure. Preferably, it has an average particle size of 0.05 to 3 μm and a graft ratio of 10 to 150% by weight.

When any monomer is used in an amount outside the range defined by the equations (5) and (6) or the intrinsic viscosity is outside the above range, the copolymer (II) has poor compatibility with the copolymer (I), and the final copolymer composition has unimproved balance of heat resistance, molding properties and mechanical strength. When the amount of the unsaturated nitrile monomer defined by the equation (6) exceeds 45% by weight, the final copolymer composition is yellowed. Thus, the amount of the unsaturated nitrile monomer (C) is very important in view of the compatibility of the copolymer (II) and the color of the final composition.

In view of the compatibility and the balance of properties, the monomeric compositions are in ranges defined by the following equations (5') and (6'):

$$\frac{(D)}{(B) + (C) + (D)} \times 100 = 0 \text{ to } 30\% \text{ by weight} \quad (5')$$

$$\frac{(C)}{(B) + (C)} \times 100 = 20 \text{ to } 40\% \text{ by weight} \quad (6')$$

There is no limitation on a weight ratio of the elastomeric polymer and the monomers in the copolymer (II). Preferably, the copolymer (II) comprises 0 to 80% by weight of the elastomeric polymer and the 100 to 20% by weight of the total monomers. In view of the balance of properties, the copolymer (II) comprises 5 to 80% by weight of the elastomeric polymer and 95 to 20% by weight of the monomers.

The copolymer (II) may be a copolymer (II-i) which is prepared in the presence of the elastomeric polymer, a copolymer (II-ii) which is prepard in the absence of the elastomeric polymer or a mixture of the copolymers (II-i) and (II-ii). In case of the copolymer mixture, the monomeric compositions and intrinsic viscosity of the copolymer (II) are calculated from those of the copolymers (II-i) and (II-ii).

The copolymer (II) may be prepared in any polymerization manner such as bulk polymerization, suspension polymerization, bulk-suspension polymerization, emulsion polymerization, solution polymerization and combinations thereof.

According to a first aspect of the present invention, the heat resistant copolymer composition comprises 5 to 95% by weight of the copolymer (I) and 95 to 5% by weight of the copolymer (II) wherein the total weight percentage of the maleimide monomer (A) and the unsaturated nitrile monomer (C) per total weight of the monomers (A), (B), (C) and (D) except for the elastomeric polymer in the copolymer (I) and the weight percentage of the unsaturated nitrile monomer (C) per total weight of the monomers (B), (C) and (D) except for the elastomeric polymer in the copolymer (II) satisfy the equation:

(The total weight percentage of the maleimide monomer ($A$) and the unsaturated monomer ($C$) − (The weight percentage of the unsaturated nitrile monomer ($C$)) = +40 to −15% by weight, and the intrinsic viscosities of the copolymers (I) and (II) satisfy the equation:

(The intrinsic viscosity of the copolymer ($I$)) − (The intrinsic viscosity of the copolymer ($II$)) = +0.5 to −1.2 dl/g.

When the amount of the copolymer (I) is less than 5% by weight, the composition does not have high heat resistance. When said amount is larger than 95% by weight, the molding properties and impact strength of the composition are impaired.

When the difference between the total weight percentage of the maleimide monomer (A) and the unsaturated nitrile monomer (C) per total weight of the monomers (A), (B), (C) and (D) except for the elastomeric polymer in the copolymer (I) and the weight percentage of the unsaturated nitrile monomer (C) per total weight of the monomers (B), (C) and (D) except for the elastomeric polymer in the copolymer (II) is outside the range from +40 to −15% by weight, or the difference of intrinsic viscosity between the copolymers (I) and (II) is outside the range from +0.5 to −1.2 dl/g, as the absolute value of difference increases, the compatibility of the copolymers (I) and (II) is impaired, and the final composition has poor heat resistance and balance of heat resistance, impact resistance and molding properties.

In view of the compatibility and the balance of properties, the difference between the total weight percentage of the maleimide monomer (A) and the unsaturated nitrile monomer (C) per total weight of the monomers (A), (B), (C) and (D) except for the elastomeric polymer in the copolymer (I) and the weight percentage of the unsaturated nitrile monomer (C) per total weight of the monomers (B), (C) and (D) except for the elastomeric polymer in the copolymer (II) is in a rage from +35 to −10% by weight, and the difference of intrinsic viscosity between the copolymers (I) and (II) is in a range from +0.4 to −0.8 dl/g.

According to a second aspect of the present invention, the copolymer composition comprises 5 to 90% by weight of the copolymer (I), 5 t 90% by weight of the copolymer (II) and 0.5 to 90% by weight of at least one other polymeric component selected from the group consisting of thermoplastic resins and elastomers wherein the monomeric compositions of the copolymers (I) and (II) satisfy the equations (1) to (6) and the difference between the total weight percentage of the maleimide monomer (A) and the unsaturated nitrile monomer (C) per total weight of the monomers (A), (B), (C) and (D) except for the elastomeric polymer in the copolymer (I) and the weight percentage of the unsaturated nitrile monomer (C) per total weight of the monomers (B), (C) and (D) except for the elastomeric polymer in the copolymer (II) and the difference of intrinsic viscosity between the copolymers (I) and (II) are in the ranges specified above.

By the addition of other thermoplastic resin and/or the elastomer, the balance of properties of the composition is further improved.

When the amount of the thermoplastic resin or the elastomer exceeds 90% by weight, the balance of properties of the composition is impaired.

Specific examples of the thermoplastic resin and elastomer are polystyrene, maleic anhydride-styrene copolymer, polymethyl methacrylate, methyl methacrylate-styrene copolymer, methyl methacrylate-methacrylic acid copolymer, methyl methacrylate-maleic anhydride copolymer, methyl methacrylate-glutaric anhydride, methyl methacrylate-styrene-glutaric anhydride copolymer, polyetheylene, polypropylene, polybutene-1, ethylene-butene-1 copolymer, propylene-butene-1 -copolymer, propylene-ethylene block copolymer, ethylene-propylene rubber, maleic anhydride grafted polyolefin, chlorinated polyolefin, ethylene-vinyl acetate copolymer, ethylene-vinyl alcohol copolymer, ethylene-(meth)acrylic acid or its metal salt copolymer, copolymer of ethylene and (meth)acrylate (e.g. methyl, ethyl, propyl, butyl, glycidyl and dimethylaminoethyl (meth)acrylate), polytetrafluoroethylene, ethylene-tetrafluoroethylene copolymer, tetrafluoroethylene-perfluoroalkyl vinyl ether copolymer, tetrafluoroethylene-hexafluoropropylene copolymer, polychlorotrifluoroethylene, polyvinyl butyral, polyvinyl chloride, butadiene rubber, styrene-butadiene random or block copolymer, hydrogenated styrene-butadiene random or block copolymer, acrylonitrile-butadiene rubber, isobutyrene rubber, acryl rubber, silicone resin, polycarbonate, polyester, polyamide, polyimide, polyamideimide, polyetherimide, polyether ketone, polyphenylene sulfide, polysulfone, polyethersulfone, polyphenylene oxide, polyoxymethylene, and mixtures thereof.

The heat resistant copolymer compositions according to the first and second aspects of the present invention may be prepared by any method corresponding to the polymerization manner of the copolymers (I) and (II). For example, the copolymers (I) and (II) in the form of latex, suspension, solution, powder, beads, pellets and blocks are blended and melt kneaded by means of a Banbury mixer or an extruder.

The heat resistant copolymer composition of the present invention may contain a conventionally used additive such as an antioxidant, a heat stabilizer, a light stabilizer, a lubricant, a plasticizer, an antistatic agent, a blowing agent, an inorganic or organic filler, a flame retardant, a surface gloss improving agent, a flatting agent, etc. The additive may be added during or after the preparation of the copolymer composition of the present invention.

Not only can the copolymer composition of the present invention be used as such, but also it can be a component of a composite material with glass fiber, metal fiber, carbon fiber or their powder, calcium carbonate, talc, gypsum, alumina, silica, mica, boron nitride, zirconia, silicon carbide, potassium titanate, metal with low melting point, and the like since it has good compatibility with various organic or inorganic materials.

The heat resistant copolymer composition of the present invention can be used for the fabrication of vehicle parts, ship parts, aircraft parts, building materials, electrical parts, furniture, business machines, etc.

PREFERRED EMBODIMENTS OF THE INVENTION

The present invention will be illustrated by following Examples, which do not limit the present invention. In Examples, "parts" and "%" are by weight unless otherwise indicated.

PREPARATION EXAMPLE

Copolymer I-1

In a 100 liter reactor equipped with a stirrer and baffles, deionized water (80 parts), potassium persulfate (0.01 part) and sodium dodecylbenzene sulfate (0.1 part) were charged. After replacing the atmosphere with nitrogen, the reactor was heated with stirring. When the temperature reached 65° C., a solution consisting of N-phenylmaleimide (0.5 part), acrylonitrile (3 parts), α-methylstyrene (7 parts) and n-dodecylmercaptan (0.04 part) was added. After the temperature was raised to 75° C. over 30 minutes, a solution consisting of N-phenylmaleimide (4.5 parts), acrylonitrile (29 parts), α-methylstyrene (56 parts) and t-dodecylmercaptan (0.5 part) and an aqueous solution consisting of potassium persulfate (0.2 part), sodium dodecylbenzene sulfate (1.3 parts) and deionized water (30 parts) were added at rates of 20 parts/hr and 8 parts/hr, respectively. After completion of continuous addition of the solutions, the reactor was kept at 75° C. for 2 hours to obtain a polymer latex. Polymerization yield, 98.7%.

After adjusting the solid content of the latex to 20%, the latex was charged into the same reactor as used above and heated to 125° C. Then, a 15% aqueous solution of magnesium sulfate was added in an amount of 40 parts per 100 parts of the solid contained in the latex over 10 minutes and kept standing at 125° C. for 10 minutes to coagulate the latex. After cooling, a polymer was recovered from the slurry followed by washing with water and drying.

Copolymer I-2

In the same reactor as used in the polymerization of the copolymer I-1, deionized water (70 parts), potassium persulfate (0.02 part) and sodium lauryl sulfate (0.1 part) were charged. After replacing the atmosphere with nitrogen, the reactor was heated to 70° C. with stirring. Then, a solution consisting of N-phenylmaleimide (10 parts), acrylonitrile (24 parts), styrene (66 parts) and t-dodecylmercaptan (0.2 part) and an aqueous solution consisting of potassium persulfate (0.1 part), sodium lauryl sulfate (1.0 part) and pure water (50 parts) were added at rates of 20 parts/hr and 10 parts/hr, respectively during which the temperature was raised to 70° C. over 30 minutes. After the completion of continuous addition of the solutions, the reactor was kept standing at 75° C. for 2 hours to obtain a latex. Polymerization yield, 98.8%.

After adjusting the solid content of the latex to 15%, the latex was charged into the same reactor as used above and heated to 135° C. Then, a 20% aqueous solution of calcium chloride sulfate was added in an amount of 30 parts per 100 parts of the solid contained in the latex over 10 minutes and kept standing at 135° C. for 10 minutes to coagulate the latex. After cooling, a polymer was recovered from the slurry followed by washing with water and drying.

Copolymers I-3 to I-8

In the same manner as in the preparation of the copolymer I-2, copolymers I-3 to I-8 as shown in Table 1 were prepared.

Copolymers X-1 and X-3

In the same manner as in the preparation of the copolymer I-2, copolymers X-1 to X-3 as shown in Table 1 were prepared.

Copolymer X-2

In a hopper of a twin-screw extruder of 40 mm in diameter equipped with a side feeder and a vent, maleic anhydride-styrene copolymer (Dylark (trade mark) 332 containing 14% of maleic anhydride manufactured by ARCO) was charged and fed to the extruder at a rate of 10 kg/hr in a nitrogen atmosphere with adjusting a resin temperature at 230° C. at an outlet of the extruder and an average residence time for 2 minutes. To the extruder, a solution consisting of aniline (98 parts) and trimethylamine (2 parts) was supplied from the side feeder at a rate of 1.4 kg/hr. Trimethylamine, unreacted aniline, water and the like were exhausted from the vent by a vacuum pump. A strand extruded from the extruder was cut to obtain pellets.

Copolymer X-4

In a 5 liter reactor, dimethylformamide (700 parts), acrylonitrile (6 parts), styrene (23 parts) and t-dodecylmercaptan (0.2 part) were charged. After replacing the atmosphere with nitrogen, the reactor was heated to 70° C. with stirring. Then, a solution of lauroyl peroxide (0.2 part) and benzoyl peroxide (0.05 part) in dimethylformamide (5 parts) was followed by continuous addition of a mixture of N-phenylmaleimide (64 parts), acrylonitrile (7 parts) and dimethylformamide (200 parts) over 2 hours. Thereafter, the reactor was heated to 90° C. and kept at that temperature for 1 hour. After cooling, the content of reactor was poured into methanol to precipitate a copolymer, which was separated, washed with methanol and dried.

Copolymer I-9

In the same reactor as used in the preparation of the copolymer I-1, deionized water (30 parts), ferrous sulfate heptahydrate (0.003 part), sodium hydrogen sulfite (0.2 part) and dextrose (0.2 part) were charged with then polybutyl acrylate latex (average particle size of the rubber 0.27 μm; gel content 7.3%; solid content 40%; emulsifier sodium dodecylbenzene sulfate; pH 5.7) (40 parts) was added. After replacing the atmosphere with nitrogen, the reactor was heated to 75° C. with stirring. Thereafter, a solution consisting of N-phenylmaleimide (18 parts), acrylonitrile (14 parts), styrene (30 parts) and t-dodecylmercaptan (0.2 part) and an aqueous solution of cumene hydroperoxide (0.2 part) and sodium dodecyl sulfate (0.4 part) in pure water (20 parts) were continuously added over 3 hours. The reactor was heated at 80° C. and kept at that temperature for 2 hours to obtain a latex. Polymer yield, 98.6% A copolymer was recovered in the same manner as in the preparation of the copolymer I-1.

Copolymers II-1 to II-5 and Y-2

According to the suspension polymerization method described in U.S. Pat. No. 3,738,972 and GB. Patent No. 1,328,625, copolymers shown in Table 1 were prepared.

Copolymer Y-1

In a 5 liter reactor equipped with a stirrer and baffles, a solution of hydroxyethylcellulose (0.2 part) in deionized water (150 parts) was charged. After replacing the atmosphere with nitrogen, a solution consisting of styrene (80 parts), acrylonitrile (10 parts), benzoyl peroxide (0.3 parts) and t-dodecylmercaptan (0.2 part) was added. After raising the temperature to 85° C., acrylonitrile (10 parts) was continuously added over 4 hours and polymerization was carried out at 95° C. for 2 hours. After the completion of polymerization, the product was dehydrated, washed with water and dried to obtain a bead copolymer.

Copolymer Y-3

In the same reactor as used in the preparation of the copolymer Y-2, styrene (11 parts), acrylonitrile (89 parts), lauroyl peroxide (0.05 part) and t-dodecylmercaptan 0.6 part) were charged. After replacing the atmosphere with nitrogen, the reactor was heated to 70° C. to initiate polymerization. When the polymerization yield reached about 5%, hydroquinone (0.2 part) was added to terminate reaction. After cooling, the content of the reactor was poured into a large amount of methanol to recover a copolymer.

Copolymer II-6

In the same reactor as used in the preparation of the copolymer I-1, deionized water (30 parts) and then polybutadiene latex (weight average particle size 0.46 μm, gel content 72%, solid content 41%, emulsifier sodium hydroabietate, pH 10.5) (60 parts, as converted to a solid content) was charged. After adding ferrous sulfate heptahydrate (0.002 part), sodium pyrophosphate (0.1 part) and dextrose (0.2 part), the reactor atmosphere was replaced with nitrogen and heated to 70° C. An aqueous solution to t-butyl hydroperoxide (0.01 part) in pure water (2 parts) was added. Therefter, a solution consisting of acrylonitrile (17 parts), styrene (25 parts) and t-dodecylmercpatan (0.2 part) and an aqueous solution consisting of t-butyl hydroperoxide (0.2 part), sodium dehydroabietate (0.6 part), sodium hydroxide (0.2 part) and pure water (20 parts) were continuously added over 2 hours. The reactor was heated to 75° C. and kept at that temperature for 2 hours to obtain a latex. Polymerization yield 98.7%. pH 11.2.

After adjusting the solid content of the latex to 25%, the latex was charged in the same reactor as used above and heated to 90° C. Then, a 15% aqueous solution of magnesium sulfate was added in an amount of 20 parts per 100 parts of the solid contained in the latex over 10 minutes. After cooling, a polymer was recovered from the slurry followed by washing with water and drying.

Copolymer II-7

In the same reactor as used in the preparation of the copolymer I-1, an aqueous solution of hydroxyethylcellulose (0.3 part) in the deionized water (200 parts) and ethylene-propylene-cyclopentadiene (45:52:3) rubber in a chip form (50 parts) were charged. Then, a solution consisting of acrylonitrile (18 parts), styrene (35 parts), t-butyl peroxide (0.2 part) and t-dodecylmercaptan (0.3 part) was added. After replacing the atmosphere with nitrogen, the reactor was heated to 130° C. with stirring and polymerization was carried out at that temperature for 4 hours. After cooling, the polymer was separated, washed with water and dried.

Copolymer II-8

In the same reactor as used in the preparation of the copolymer I-1, deionized water (30 parts), ferrous sulfate heptahydrate (0.002 part), sodium pyrophosphate (0.1 part) and dextrose (0.2 part) and then acrylonitrile-butadiene copolymer latex (weight average particle size 0.17 μm, gel content 77%, solid content 43%, content of acrylonitrile 20%, emulsifier sodium lauryl sulfate, pH 5.2) (50 parts as converted to a solid content) were charged. After replacing the atmosphere with nitrogen, the reactor was heated to 70° C. Thereafter, a solution consisting of acrylonitrile (12 parts), styrene (30 parts), glycidyl methacrylate (10 parts) and t-dodecylmercaptan (0.3 part) and an aqueous solution consisting of cumene hydroperoxide (0.2 part), sodium lauryl sulfate (0.5 part) and pure water (20 parts) were continuously added over 3 hours. The reactor was heated to 80° C. and kept at that temperature for 2 hours to obtain a latex. Polymerization yield 98.7%.

From the latex, the copolymer was recovered in the same manner as in the preparation of the copolymer I-1.

The results of analysis of the copolymers prepared in Preparation Example are shown in Tables 1 and 2.

The monomeric compositions of the copolymers were calculated from the elementary analyses of carbon, hydrogen, nitrogen and oxygen, and $T_g$ was measured by a differential scanning calorimeter.

Abbreviations used in Tables are as follows:
NPMI: N-Phenylmaleimide
S: Styrene
AMS: α-Methylstyrene
AN: Acrylonitrile
MAN: Methacrylonitrile
MMA: Methyl methacrylate
GMA: Glycidyl methacrylate

EXAMPLE AND COMPARATIVE EXAMPLE

The copolymers prepared in Preparation Example were blended in a ratio shown in Tables 3-6. To 100 parts of the copolymer blend, triethyleneglycol bis[3-(3-tert.-butyl-5-methyl-4-hydroxyphenyl)propionate] (0.1 part) and di(2,4-di-tert.-butylphenyl)pentaerythritol diphosphite (0.1 part) as stabilizers and ethylene bis-stearoamide (0.1 part) and calcium stearate (0.1 part) as lubricants were added and kneaded in a vented twin-screw extruder (40 mm φ) at 250° ) to 300° C. followed by extrusion to form pellets.

The total content of residual monomers in the pellets was less than 0.2% in all cases.

The pellets were charged in an injection molding machine to produce test pieces, which were examined for their physical properties. The results are shown in Tables 3-6.

A typical copolymer (I) or (II) without blending was kneaded and injection molded in the same manner as above and physical properties of test pieces were measured. The results are shown in Table 4.

TABLE 1

| Copolymer No. | Monomer composition (%) | | | | | | Intrinsic viscosity (dl/g) | $T_g$ (°C.) |
|---|---|---|---|---|---|---|---|---|
| | NPMI | S | AMS | AN | MAN | MMA | | |
| I-1 | 5.1 | — | 67.0 | 27.9 | — | — | 0.52 | 136 |
| I-2 | 10.4 | 66.6 | — | 23.0 | — | — | 0.66 | 122 |
| I-3 | 20.3 | 57.0 | — | 22.7 | — | — | 0.68 | 136 |
| I-4 | 30.5 | 50.8 | — | 18.7 | — | — | 0.48 | 149 |
| I-5 | 30.6 | 50.8 | — | 18.6 | — | — | 0.62 | 149 |
| I-6 | 30.5 | 50.6 | — | 18.9 | — | — | 0.90 | 150 |
| I-7 | 41.9 | 45.2 | — | 6.9 | 6.0 | — | 0.63 | 167 |
| I-8 | 30.4 | 39.8 | — | 12.6 | — | 17.2 | 0.65 | 149 |
| II-1 | — | 76.4 | — | 23.6 | — | — | 0.62 | 107 |
| II-2 | — | 70.2 | — | 29.8 | — | — | 0.47 | 108 |
| II-3 | — | 70.5 | — | 29.5 | — | — | 0.59 | 109 |
| II-4 | — | 70.4 | — | 29.6 | — | — | 0.96 | 110 |
| II-5 | — | 63.2 | — | 36.8 | — | — | 0.67 | 110 |
| X-1 | 30.4 | 51.1 | — | 18.5 | — | — | 0.26 | 146 |
| X-2 | 20.7 | 79.3 | — | — | — | — | 0.52 | 135 |
| X-3 | 30.3 | 51.0 | — | 18.7 | — | — | 1.41 | 151 |
| X-4 | 64.1 | 23.9 | — | 12.0 | — | — | 0.55 | 202 |
| Y-1 | — | 81.7 | — | 18.3 | — | — | 0.64 | 106 |
| Y-2 | — | 70.6 | — | 29.4 | — | — | 1.65 | 110 |
| Y-3 | — | 50.2 | — | 49.8 | — | — | 0.69 | 112 |

TABLE 2

| Copolymer No. | Graft ratio (%)[*1] | Elastomer content (%) | Monomer composition (%) | | | | Intrinsic viscosity[*2] (dl/g) |
|---|---|---|---|---|---|---|---|
| | | | NPMI | S | AN | GMA | |
| I-9 | 58 | 40 | 30 | 49 | 21 | — | 0.62 |
| II-6 | 43 | 60 | — | 69 | 31 | — | 0.51 |
| II-7 | 49 | 50 | — | 68 | 32 | — | 0.57 |
| II-8 | 52 | 50 | — | 59 | 22 | 19 | 0.53 |

Note:
[*1]Measured by using acetone as an extraction solvent.
[*2]Intrinsic viscosity of non-grafted copolymer.

TABLE 3

| Example No. | Copolymer (I)/(II) | Blend ratio (parts) | NPMI content (%) | $T_g$ °C. | HDT[*1] °C. | IS[*2] (kg·cm/cm$^2$) | Color of molded article |
|---|---|---|---|---|---|---|---|
| 1 | I-1/II-3 | 50/50 | 2.6 | 120 | 111 | 15 | Slight yellow |
| 2 | I-2/II-3 | 50/50 | 5.2 | 112 | 103 | 14 | ↑ |
| 3 | I-3/II-3 | 50/50 | 10.2 | 119 | 109 | 15 | ↑ |
| 4 | I-4/II-3 | 50/50 | 15.3 | 126 | 116 | 13 | ↑ |
| 5 | I-5/II-3 | 50/50 | 15.3 | 127 | 117 | 14 | ↑ |
| 6 | I-6/II-3 | 50/50 | 15.3 | 127 | 117 | 14 | ↑ |
| 7 | I-7/II-3 | 50/50 | 21.0 | 135 | 124 | 10 | Pale yellow |
| 8 | I-8/II-3 | 50/50 | 15.2 | 126 | 116 | 14 | Slight yellow |
| 9 | I-4/II-1 | 50/50 | 15.3 | 125 | 115 | 12 | ↑ |
| 10 | I-4/II-2 | 50/50 | 15.3 | 126 | 116 | 12 | ↑ |
| 11 | I-4/II-4 | 50/50 | 15.3 | 127 | 117 | 16 | ↑ |
| 12 | I-4/II-5 | 50/50 | 15.3 | 127 | 117 | 14 | ↑ |
| 13 | I-5/II-3 | 20/80 | 6.1 | 114 | 104 | 15 | ↑ |
| 14 | I-5/II-3 | 70/30 | 21.4 | 135 | 126 | 11 | Pale yellow |
| 15 | I-1/II-5 | 50/50 | 2.6 | 122 | 113 | 14 | Slight yellow |
| 16 | I-2/II-5 | 50/50 | 5.2 | 114 | 104 | 14 | ↑ |
| 17 | I-7/II-5 | 50/50 | 24.5 | 141 | 131 | 10 | Pale yellow |

Note:
[*1]Heat Destortion Temperature: ¼ inch test piece, 264 psi load, no annealing
[*2]Izod Impact Strength: ¼ inch test piece, at 23° C.

TABLE 4

| Example No. | Copolymer (I)/(II) | Blend ratio (parts) | NPMI content (%) | $T_g$ (°C.) | HDT (°C.) | IS (kg·cm/cm$^2$) | Color of molded article |
|---|---|---|---|---|---|---|---|
| Comp. 1 | X-1/II-4 | 50/50 | 15.2 | 123 | 112 | 12 | Slight yellow |
| Comp. 2 | X-2/II-3 | 50/50 | 10.6 | 112;135 | 105 | 11 | ↑ |
| Comp. 3 | X-3/II-1 | 50/50 | 15.2 | 113;146 | 113 | 11 | ↑ |
| Comp. 4 | X-4/Y-1 | 50/50 | 32.1 | 107;201 | 136 | 6 | Light brown |
| Comp. 5 | I-5/Y-1 | 20/80 | 6.1 | 107;150 | 99 | 12 | Slight yellow |
| Comp. 6 | I-5/Y-1 | 50/50 | 15.3 | 107;149 | 112 | 10 | ↑ |
| Comp. 7 | I-5/Y-1 | 70/30 | 21.4 | 108;149 | 123 | 7 | Pale yellow |
| Comp. 8 | X-1/Y-2 | 50/50 | 15.2 | 124 | 112 | 13 | Slight yellow |
| Comp. 9 | I-2/Y-3 | 50/50 | 5.2 | 111;118 | 101 | 8 | Brown |
| Comp. 10 | X-3/Y-1 | 50/50 | 15.2 | 106;150 | 113 | 11 | Slight yellow |

TABLE 4-continued

| Example No. | Copolymer (I)/(II) | Blend ratio (parts) | NPMI content (%) | $T_g$ (°C.) | HDT (°C.) | IS (kg·cm/cm²) | Color of molded article |
|---|---|---|---|---|---|---|---|
| Comp. 11 | X-2/II-1 | 50/50 | 10.6 | 110;137 | 104 | 10 | ↑ |
| Ref. 1 | I-2 | — | 10.4 | 122 | 113 | 15 | Slight yellow |
| Ref. 2 | I-3 | — | 20.3 | 136 | 126 | 13 | Pale yellow |
| Ref. 3 | I-5 | — | 30.6 | 149 | 140 | 8 | ↑ |
| Ref. 4 | II-1 | — | — | 107 | 96 | 15 | Colorless |
| Ref. 5 | II-3 | — | — | 109 | 98 | 16 | ↑ |
| Ref. 6 | II-5 | — | — | 110 | 99 | 16 | ↑ |

TABLE 5

| Example No. | Copolymer (I)/(II) | Blend ratio (parts) | NPMI content (%) | MFR (g/10 min.) | HDT (°C.) | N-IS*[1] (kg·cm/cm²) |
|---|---|---|---|---|---|---|
| 19 | I-5/II-3 + II-6 | 14/56 + 30 | 4.3 | 120 | 95 | 18.7 |
| 20 | I-5/II-3 + II-6 | 35/35 + 30 | 10.7 | 62 | 104 | 16.0 |
| 21 | I-5/II-3 + II-6 | 56/14 + 30 | 17.1 | 23 | 114 | 12.4 |
| 22 | I-7/II-2 + II-7 | 40/40 + 20 | 16.8 | 36 | 113 | 10.2 |
| 23 | I-5/II-2 + II-7 | 35/35 + 30 | 15.3 | 46 | 112 | 12.8 |
| 24 | I-4 + I-9/II-3 | 49 + 30/21 | 20.3 | 25 | 122 | 9.7 |
| 25 | I-4/II-3 + II-8 | 49/21 + 30 | 14.9 | 49 | 111 | 12.3 |
| 26 | I-9/II-3 | 50/50 | 9.0 | 60 | 102 | 18.2 |
| 27 | II-8/I-5 | 80/20 | 24.5 | 7.6 | 126 | 7.2 |
| 28 | II-8/I-5 | 70/30 | 21.4 | 11 | 121 | 10.8 |
| 29 | II-8/I-5 | 50/50 | 15.3 | 29 | 111 | 15.6 |
| Comp. 12 | I-9/Y-1 | 50/50 | 9.0 | 67 | 97 | 15.7 |
| Comp. 13 | X-2/II-8 | 70/30 | 14.5 | 65 | 107 | 9.3 |

Note:
*[1]Notched Izod Impact Strength, ¼ inch test piece, at 23° C.

TABLE 6

| Example No. | Polymer blend*[1] | Blend ratio (parts) | HDT (°C.) | N-IS (kg·cm/cm²) |
|---|---|---|---|---|
| 30 | I-5/II-3/PC/— | 25/25/50/— | 127 | 12.4 |
| 31 | I-5/II-3/—/EGM | 50/45/—/5 | 117 | 3.2 |
| 32 | I-5/II-3/Polyamide/— | 40/40/20/— | 136 | 5.3 |
| 33 | I-9/II-3/—/Polyester | 50/45/—/5 | 100 | 19.5 |
| 34 | I-5/II-5/—/NBR | 70/20/—/10 | 118 | 7.4 |
| 35 | I-7/II-5/PC/NBR | 25/20/50/5 | 127 | 11.2 |
| Comp. 14 | I-5/Y-1/PC/— | 25/25/50/— | 122 | 9.7 |
| Comp. 15 | I-5/Y-1/—/EGM | 50/45/—/5 | 112 | 2.1 |
| Comp. 16 | I-5/Y-1/Polyamide/— | 40/40/20/— | 131 | 3.6 |
| Comp. 17 | I-9/Y-1/—/Polyester | 50/45/—/5 | 96 | 16.2 |
| Comp. 18 | I-5/Y-1/—/NBR | 70/20/—/10 | 113 | 5.7 |
| Comp. 19 | I-7/Y-1/PC/NBR | 25/20/50/5 | 121 | 8.0 |

Note:
*[1]Copolymer (I)/copolymer (II)/thermoplastic resin/elastomer. PC: Polycarbonate (Panlite L-1250 (trade mark) by Teijin Chemical). Polyamide: Novamid 1015 G 30 (trade mark) by Mitsubishi Chemical. EGM: Ethylene/glycidyl methacrylate copolymer (Bondfast 2B (trade mark) by Sumitomo Chemical). NBR: Acrylonitrile-butadiene (25/75) copolymer.

As understood from the results in Tables 3 and 4, the heat resistant copolymer composition has a single glass transition temperature and good compatibility. On the contrary, each of the comparative compositions has two glass transition temperatures corresponding to those of the copolymer to be blended.

What is claimed is:

1. A heat resistant copolymer composition comprising:
5 to 95% by weight of a copolymer (I) which is obtainable by copolymerizing (A) a maleimide monomer (B) an aromatic vinyl monomer, (C) an unsaturated nitrile monomer, and 0% to 50% by weight of the total weight of (A), (B), (C), and (D) of (D) at least one other comonomer copolymerizable with (A), (B) and (C) in the presence of 0% to 80% by weight of the total weight of (A), (B), (C), (D) and (E) of (E) an elastomeric polymer and has an intrinsic viscosity of 0.3 to 1.2 dl/g, and 95 to 5% by weight of a copolymer (II) which is obtainable by copolymerizing (B) the aromatic vinyl monomer, (C) the unsaturated nitrile and 0 to 50% by weight of the total weight of (B), (C) and (D) of (D) at least one other comonomer copolymerizable with (B) and (C) in the presence of 0% to 80% by weight of the total weight of (B), (C), (D) and (E) of (E) an elastic polymer and has an intrinsic viscosity of 0.3 to 1.5 dl/g, wherein the total weight percentage of the monomers (A) and (C) in the copolymer (I) per total weight of the monomers (A), (B), (C) and (D) in the copolymer (I) and the weight percentage of the monomer (C) in the copolymer (II) per total weight of the monomers (B), (C) and (D) in the copolymer (II) satisfy the following equation: (Said total weight percentage of the monomers (A) and (C) in copolymer (I))−(Said weight percentage of the monomer (C) in copolymer (II))= +40 to −15% by weight, and wherein the intrinsic viscosities of the copolymers (I) and (II) satisfy the following equation: (The intrinsic viscosity of the copolymer(I))−(The intrinsic viscosity of the copolymer (II))= +0.5 to −1.2 dl/g, wherein all intrinsic viscosities refer to the intrinsic viscosity of the non-grafted polymers, when grafted polymers are present, said copolymer (I) having a composition of the monomers (A), (B), (C) and (D) satisfying the following equations (1), (2), and (3) wherein (A), (B), (C) and (D) stand for the respective weights thereof:

$$\frac{(A)}{(A) + (B) + (C) + (D)} \times 100 = (F) \quad (1)$$

$$\frac{(B) + (C)}{(A) + (B) + (C) + D} \times 100 = (G) \quad (2)$$

$$\frac{(C)}{(B) + (C)} \times 100 = (H) \quad (3)$$

where (F) ranges from 1 to 60% by weight, (G) ranges from 99 to 40% by weight and (H) ranges from 5 to 45% by weight, said copolymer (II) having a composition of the monomers (B) and (C) satisfying the following equation (4) wherein (B) and (C) stand for the respective weights thereof:

$$\frac{(C)}{(B) + (C)} \times 100 = (J) \quad (4)$$

where (J) ranges from 20 to 45% by weight.

2. The heat resistant copolymer composition according to claim 1 which comprises 5 to 90% by weight of the copolymer (I), 5 to 90% by weight of the copolymer (II) and further 0.5 to 90% by weight of at least one polymeric component other than copolymers (I) and (II) selected from the group consisting of thermoplastic resins and elastomers.

3. The heat resistant copolymer composition according to claim 1, wherein the amount of comonomer (C) for copolymer (I) ranges from 0 to 40% by weight of the total weight of (A), (B), (C) and (D) for copolymer (I), (F) ranges from 5 to 50% by weight, (G) ranges from 95 to 50% by weight and (H) ranges from 10 to 40% by weight.

4. The heat resistant copolymer composition according to claim 2 wherein the amount of comonomer (D) for copolymer (I) ranges from 0 to 40% by weight of the total weight of (A), (B), (C) and (D) for copolymer (I), (F) rages from 5 to 50% by weight, (G) ranges from 95 to 50% by weight, and (H) ranges from 10 to 40% by weight.

5. The heat resistant copolymer composition according to claim 1, wherein the amount of comonomer (D) for copolymer (II) ranges for 0 to 30% by weight of the total weight of (B), (C) and (D) for copolymer (II) and (J) ranges from 20 to 40% by weight.

6. The heat resistant copolymer composition according to claim 2, wherein the amount of comonomer (D) for copolymer (II) ranges from 0 to 30% by weight of the total weight of (B), (C) and (D) for copolymer (II) and (J) ranges from 20 to 40% by weight.

7. The heat resistant copolymer composition according to claim 1, wherein the total weight percentage of the maleimide monomer (A) and the unsaturated nitrile monomer (C) per total weight of the monomers (A), (B), (C) and (D) in the copolymer (I) and the weight percentage of the unsaturated nitrile monomer (C) per total weight of the monomers (B), (C) and (D) in the copolymer (II) satisfy the following equation:

(Said total weight percentage of the maleimide monomer $(A)$ and the unsaturated nitrile monomer $(C)$ in copolymer $(I)$) − (Said weight percentage of the unsaturated nitrile monomer $(C)$ in copolymer $(II)$) = +35 to −10% by weight, and the intrinsic viscosities of the copolymers (I) and (II) satisfy the following equation:

(The intrinsic viscosity of the copolymer $(I)$) − (The intrinsic viscosity of the copolymer $(II)$) = +0.4 to −0.8 dl/g.

8. The heat resistant copolymer composition according to claim 2, wherein the total weight percentage of the maleimide monomer (A) and the unsaturated nitrile monomer (C) per total weight of the monomers (A), (B), (C) and (D) in the copolymer (I) and the weight percentage of the unsaturated nitrile monomer (C) per total weight of the monomers (B), (C) and (D) in the copolymer (II) satisfy the following equation:

(Said total weight percentage of the maleimide monomer $(A)$ and the unsaturated monomer $(C)$ in copolymer $(I)$) − (Said weight percentage of the unsaturated nitrile monomer $(C)$ in copolymer $(II)$) = +35 to −10% by weight, and the intrinsic viscosities of the copolymers (I) and (II) satisfy the following equation:

(The intrinsic viscosity of the copolymer $(I)$) − (The intrinsic viscosity of the copolymer $(II)$) = +0.4 to −0.8 dl/g.

9. The heat resistant copolymer composition according to claim 2 wherein said polymeric component is selected from the group consisting of polyester, polycarbonate, polyamide, ethylene/glycidyl methacrylate copolymer and acrylonitrile-butadiene copolymer.

* * * * *

UNITED STATES PATENT AND TRADEMARK OFFICE
CERTIFICATE OF CORRECTION

PATENT NO. : 4,877,833

DATED : October 31, 1989

INVENTOR(S) : Masatsune Kondo et al

It is certified that error appears in the above-identified patent and that said Letters Patent is hereby corrected as shown below:

Claim 1 (column 15, line 59), after "mer" insert a comma.

Claim 1 (column 16, line 56), change "elastic" to --elastomeric--.

Claim 1 (column 17, line 14), to the right of the formula and above "(2)" insert --(1)--.

Signed and Sealed this

Twenty-seventh Day of March, 1990

Attest:

JEFFREY M. SAMUELS

*Attesting Officer*  *Acting Commissioner of Patents and Trademarks*